United States Patent [19]

Lybbert

[11] 4,190,144

[45] Feb. 26, 1980

[54] CONCRETE DISCHARGE CHUTES

[76] Inventor: Evart K. Lybbert, 79 Laurel St., Salt Lake City, Utah 84103

[21] Appl. No.: 913,986

[22] Filed: Jun. 9, 1978

[51] Int. Cl.² .................. B65G 11/00

[52] U.S. Cl. .................. 193/10

[58] Field of Search .................. 193/10, 16

[56] References Cited

U.S. PATENT DOCUMENTS

| | | | |
|---|---|---|---|
| 1,351,725 | 8/1920 | Mosby | 193/10 |
| 2,210,653 | 8/1940 | Dennis | 193/27 |
| 2,523,558 | 9/1950 | Cavallier | 193/10 |
| 3,053,367 | 9/1962 | Lynch | 193/10 |

*Primary Examiner*—Richard A. Bertsch
*Attorney, Agent, or Firm*—Lynn G. Foster

[57] ABSTRACT

Novel discharge sections for a gravity flow concrete conveyor chute comprising left and/or right diagonal angle sections and left and right elbow end sections for more efficiently discharging concrete from a ready mix truck. These discharge sections are made of steel or other suitable material and provide for releasable attachment to the distal end of a compatible chute usually U-shaped conventionally utilized in directing concrete from a ready mix truck to a specific location.

8 Claims, 6 Drawing Figures

CONCRETE DISCHARGE CHUTES

BACKGROUND

1. Field of Invention

The present invention relates generally to conveyor chutes and more particularly to improved terminal concrete discharge chute sections sized and shaped to cause concrete to be unloaded at an angle to the remainder of the truck chute, as, for example, when the conveyor chute of a ready mix concrete truck is located at an acute angle less than 90 degrees in respect to a concrete form where the concrete is to be deposited.

2. Prior Art

Gravity flow conveyor chutes used in delivering concrete on a job from a ready mix truck typically comprise a series of linear U-shaped sections, about four feet long, which are hooked together. Both the proximal and distal ends of each section are perpendicular to the longitudinal axis of the section. The mentioned sections attach to a similarly shaped starter chute section that is pivotable though integral with the ready mix truck. However, the starter chute section is, normally, wider and deeper at the proximal end where the concrete from the mixer enters the truck chute.

The linear chute system works well enough in many applications; however, often it is necessary to pour concrete into a narrow vertical form or the like to construct a foundation, etc. To avoid excessive delays and prevent loss of concrete, the chute must be positioned at or very near a right angle to the concrete form. Often, the nature of the construction site, the existence of excavation stored randomly, the nature of the opening where the concrete is being placed, the softness of the adjacent terrain, etc., dictate or make advisable placement of the ready mix truck conveyor chute at an angle less than 90 degrees to the concrete form. Under these conditions, discharge from the standard conventional perpendicular-ended chute burdensomely requires the constant attention of one or more workers to avoid loss of expensive concrete and expenditure of an excessive amount of time for the proper placement of the concrete in the form. In fact, under even the best of conditions at the site of a typical foundation pour, the necessity for the truck to move around the perimeter of the foundation while discharging concrete to fill the forms up to grade level makes it advisable that the conveyor chute be positioned at an angle of less than 90 degrees in relation to the forms in order to be able to compensate for changes in the distance from the truck to the forms by manually rotating the chute.

Although the concrete industry has been well established for many decades, no one has advanced a practical solution to the above mentioned problem. The proposed solution found in U.S. Pat. No. 3,746,140 is the antithesis of the present invention and requires a flexible tubular discharge member 50 which is caused to hang within or above the concrete form where concrete is being poured. Utilization of a flexible tube as suggested by U.S. Pat. No. 3,746,140 is objectionable since the flexible discharge tube will tend to cause the aggregate within the fluid concrete to segregate. Thus, the resulting concrete article (foundation, etc.) will lack homogenity and strength. Spalling in response to wetting and drying and freezing and thawing often occurs. In addition, the tubular discharge member limits the rate at which concrete is poured and has a very restricted useful life, due to the wear and stress imposed by the concrete passing through the tubular discharge member. Furthermore, the tubular discharge member must be disposed substantially immediately above the concrete form and has no capacity to provide for additional horizontal displacement of the concrete per se.

BRIEF SUMMARY AND OBJECTS OF THE INVENTION

In brief summary, the present invention comprises concrete discharge chute sections, each of which causes a stream of concrete to be substantially aligned with and poured into a concrete form from a ready mix truck whose conveyor chute is located in respect to the orientation of the concrete form at an acute angle of less than 90 degrees, to thereby improve the efficiency of concrete placement, and alleviate or eliminate concrete waste while avoiding segregation.

With the foregoing in mind, it is a primary object of the present invention to provide one or more novel concrete discharge chute sections for ready mix concrete trucks.

It is a further principal object of the present invention to provide novel concrete discharge chute sections which cause a stream of concrete issuing therefrom to be substantially aligned with a concrete form.

A further important object of the present invention is the provision of one or more novel concrete discharge sections which causes substantial aligned orientation of concrete discharge from a ready mix chute when the conveyor chute of the concrete truck is misoriented in respect to the concrete form receiving the concrete.

An additional significant object of the present invention is the provision of a ready mix concrete truck having a novel concrete discharge chute section which causes a stream of concrete to be substantially aligned with and poured into a concrete form from the conveyor chute of the ready mix concrete truck which chute is located in respect to the orientation of the concrete form at an acute angle less than 90 degrees.

An important object of the present invention is the elimination or alleviation of waste in placing a stream of concrete into a concrete form.

An additional paramount object of the present invention is the provision of a ready mix concrete truck, provided with one or more concrete discharge chute sections, each of which enhances the time efficiency and accuracy of concrete poured in a form.

A further significant object of the present invention is the provision of one or more novel concrete discharge chute sections for use in conjunction with a ready mix concrete truck to orient a stream of concrete being placed into a concrete form when the conveyor chute of the ready mix concrete truck is misoriented, while at the same time avoiding concrete segregation.

A further important object of the present invention is to precisely discharge a stream of concrete from a ready mix concrete truck into a concrete form when the concrete truck and/or its conveyor chute is not precisely located in respect to the concrete form.

These and other objects and features of the present invention will be apparent from the following detailed description taken in reference to the accompanying drawings.

DETAILED DESCRIPTION OF THE ILLUSTRATED EMBODIMENTS

Figure 1:
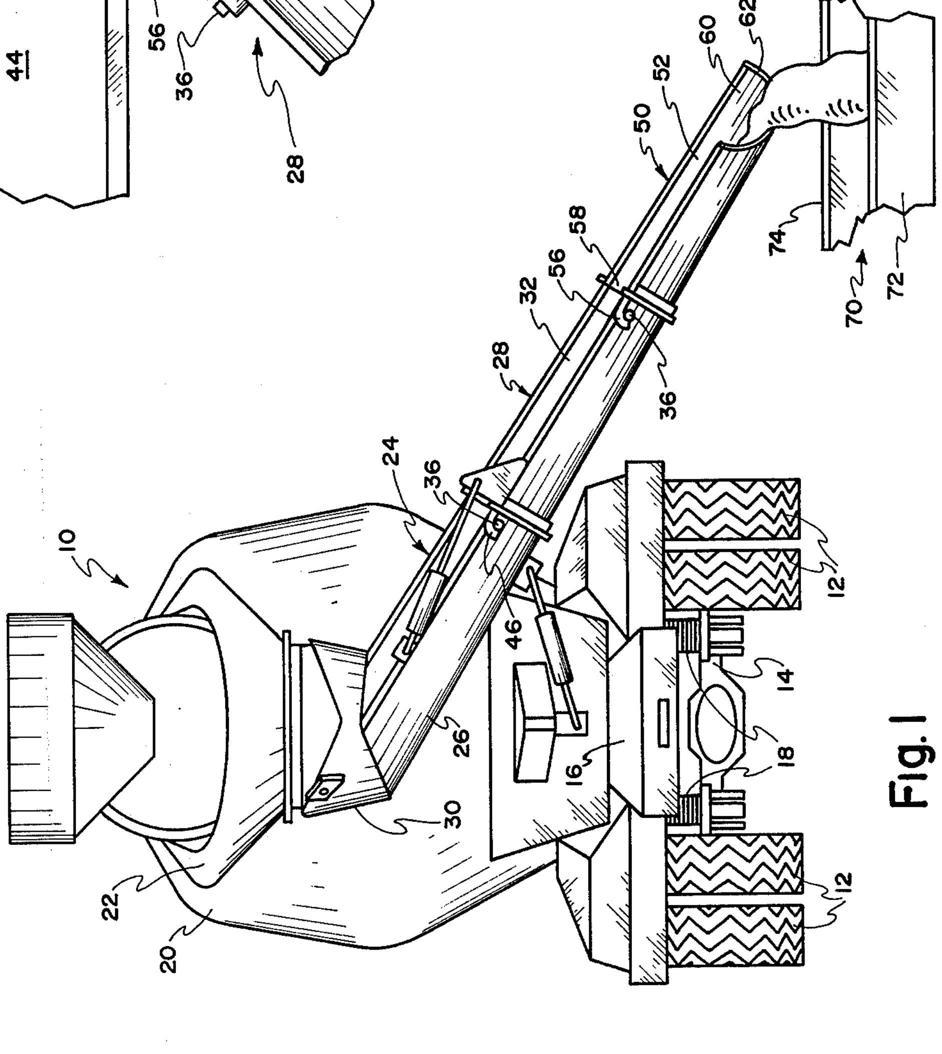
FIG. 1 is a perspective representation of a ready mix concrete truck, shown schematically and equipped with a concrete discharge chute section according to the present invention.

Specific reference is now made to the drawings wherein like numerals are used to designate like parts throughout. FIG. 1 isometrically illustrates the context and environment in which the present invention applies. More specifically, a rear discharge ready mix truck, generally designated 10, is illustrated as being supported upon ground engaging tandem wheel mounted tires 12 rotatably carried at the opposite ends of an axle assembly 14. The truck 10 also comprises a rigid body frame 16 with the load thereof being transferred to the ground through a suspension system 18, the axle assembly 14 and the tires 12.

The ready mix truck also comprises a conventional mixer 20 equipped with a conventional concrete dispenser 22, which introduces, during use, a stream of concrete into the sloping chute 24 of the truck. As is practice in the industry, the chute 24 is illustrated as comprising a plurality of sections, the top one of which is designated 26. Starter chute section 26 is permanently attached to the truck in a way to accommodate arcuate displacement thereof relative to the truck along two paths, i.e. up and down and side to side, to facilitate selective placement of fluid concrete.

One or more intermediate sections 28 are conventionally successively releasably attached together, with the top section 28 being releasably attached to the distal end of section 26.

Chute sections are normally formed of mild steel on the order of ½ inch thick. The upper end of the top starter trough 26 comprises an enlargement 30, where the stream of concrete from the mixer 20 is initially deposited from dispenser 22. The remainder of the section 26 and each section 28 respectively comprise a linear U-shaped trough or body 32 (FIG. 2) the interior of which is smooth. The distal end of section 26 and the distal end of each section 28 respectively comprise distal edges 34 which are perpendicular to the longitudinal axis of the section of which they are a part. A pair of opposed studs or pins 36 are welded to and project oppositely outwardly each in a direction perpendicular to the axis of the contiguous chute section for assisting in releasably securing the sections one to the next. Other specific mechanisms for releasably securing chute sections exist, and the version described here is illustrative only.

As can be appreciated from FIG. 1, the truck chute 24 (comprising section 26 and one or more sections 28) is linear and slopes in a downward direction for gravity displacement and discharge of the stream of concrete. The truck 10 is conventionally equipped with a power unit for elevating and lowering the truck chute 24. Typically, the truck chute 24 is manually rotated from side to side. By so adjusting the vertical and horizontal disposition to the chute 24, concrete is caused to be placed in a desired position.

The distal end of chute section 26 and of each chute section 28 typically comprises a stepped abutment edge, generally designated 38. Edge 38 comprises an annular lip 40 which defines a radial shoulder 42. A second, recessed radial shoulder 44 is disposed interior of the lip 40. If desired, the exterior of the distal end of each section 26 and 28 may be appropriately reinforced (as may be all or any part of the U-shaped trough).

The proximal end of each chute section 28 comprises opposed hook members 46, welded to or otherwise made integral with the remainder of chute section and sized, located and shaped to fit over the distal studs 36 of the adjacent chute section. In this way, the elevated portion of adjacent sections are releasably secured under force of gravity one to the next to accommodate downward gravity displacement of the stream of concrete emanating from the dispenser 22. Other specific mechanisms for releasably securing chute sections exist, and the version described here is illustrative only.

The proximal end of each section 28 also comprises a stepped proximal edge 48 which comprises a pair of concentric though offset shoulders 51 and 53 separated by an annular surface 54. The stepped distal edge 38 of each section is formed to accurately match the stepped proximal edge 48 of the next chute section in concrete-tight relation. Thus, the shoulders 42 and 44 are caused to be compressively engaged by shoulders 51 and 53, respectively, due to the weight of the concrete section comprising stepped proximal edge 48, rotatably suspended by the pair of hooks 46 resting upon the pins or studs 36, and the interior of the entire chute 24 is smooth, continuous and substantially uninterrupted.

If desired, the proximal end of each chute section may be exteriorly reinforced (as may be all or any part of the trough thereof).

While only a rear unload concrete ready mix truck has been illustrated, it is to be appreciated that the present invention applies to all types of ready mix vehicles. And while only U-shaped chute sections have been illustrated, the present invention applies to trough sections of any cross-sectional shape.

Figure 2:
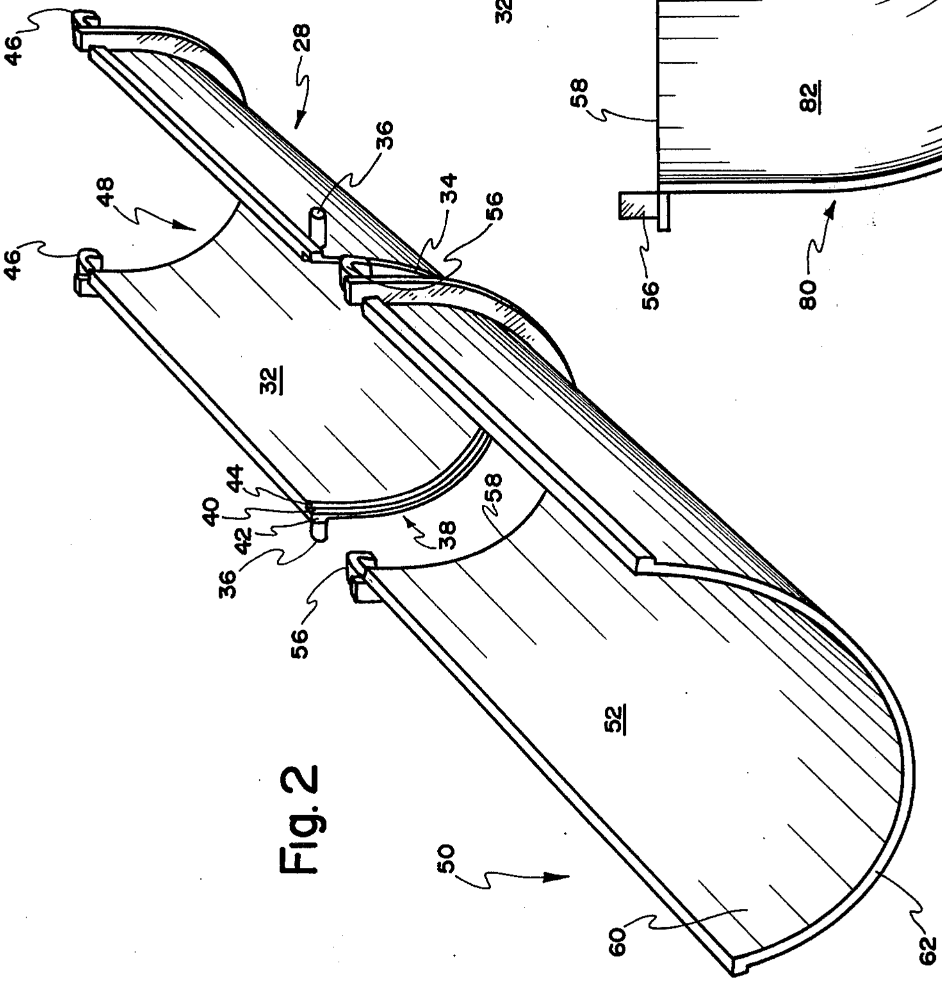
FIG. 2 is an exploded, enlarged perspective of the discharge chute section and the adjacent standard chute section of FIG. 1.

Reference is now made to FIG. 2 which illustrates a first presently preferred concrete discharge chute section, generally designated 50, fashioned according to the present invention. Chute section 50 may be formed of steel or other appropriate material. The concrete discharge chute section 50 comprises an interiorly smooth, linear U-shaped trough 52 which is shaped similar to and is compatible with the trough 32 of the adjacent truck chute section 28. The proximal end of the concrete discharge chute section 50 comprises a stepped edge 58 which is substantially identical to the previously described edges 48 so as to be accurately matched in concrete-tight relation with edge 38.

The proximal end of section 50 also comprises a pair of integral spaced, parallel hook members 56, which are shaped similar to or identical with the hooks 46 and are located, sized and shaped to respectively fit over the studs 36 of the adjacent chute section 28 and to be held in said position by force of gravity, which causes the concrete discharge chute section 50 to rotate upon the adjacent studs 36, bringing the stepped edge 58 into compressive abutting relation with the edge 38 of the adjacent section 28. Thus, the stream of concrete being gravity displaced downwardly along the truck chute 24 will pass from the last truck chute section 28 linearly into and linearly along the concrete discharge chute 50. Accordingly, the homogeneous mixture of the stream of concrete is preserved and segregation avoided.

The distal end 60 of the concrete discharge chute section 50 comprises a diagonal distal edge 62 illustrated as being disposed at approximately 45 degrees in respect to the longitudinal axis of the section 50, although other diagonal angles could be employed to define the distal edge 62. The diagonal edge may be either right or left as well. The exterior of the member 50 adjacent the distal end 62 may be reinforced as desired to preserve the structural integrity and shape of the member 50 as well as to maximize its useful life.

Figure 5:
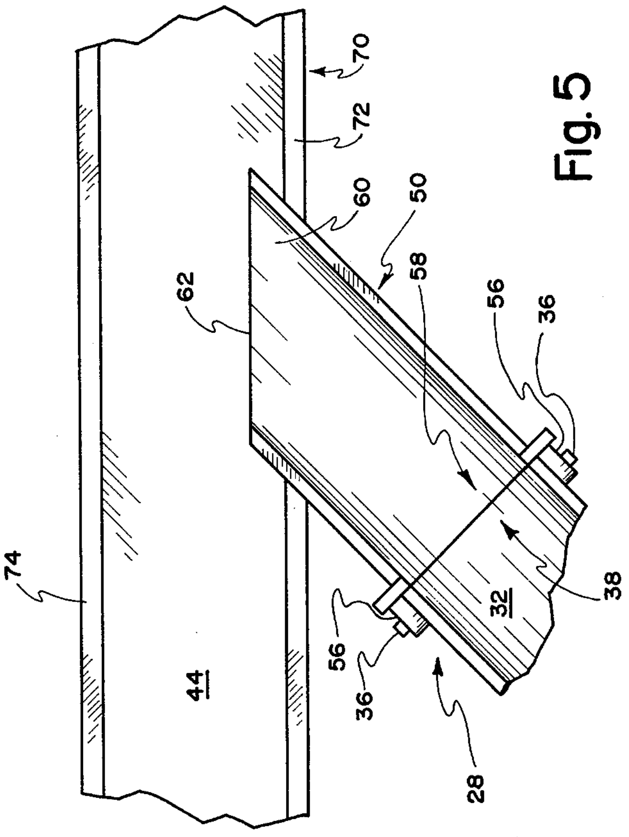
FIG. 5 is a schematic plan view illustrating the manner in which concrete discharge chute sections, according to the present invention, cause a stream of concrete to be aligned with and poured directly into a concrete form.

Accordingly, the stream of concrete (moving under force of gravity linearly along the interior of and parallel with the longitudinal axis of the section 50) is caused to leave the chute section 50 and fall as a stream in substantial alignment with a concrete form 70 (see FIGS. 1 and 5) independent of the orientation of the truck in respect to the concrete form 70, provided that the rotational and vertical orientation of the connected chute sections has been properly controlled by the operator to create the requisite, substantially parallel alignment between the discharge edge and the concrete form. In other words, the present invention allows the stream of concrete to be discharged from the ready mix truck 10 at full speed, without requiring substantial time delays or additional concrete placement personnel such that substantially all of the stream of concrete is caused to be placed within the narrow opening of concrete form 70 to either elminate or substantially alleviate any loss of concrete, no matter what the acute angular relationship may be between the form 70 and the longitudinal axis of the truck 10.

While the concrete form 70 may be of any type, it is illustrated as comprising closely spaced vertically directed walls 72 and 74, which are approprately rigidly and stationarily secured in the illustrated position sufficient to receive and contain the liquid concrete being poured therein, as described.

Figure 3:
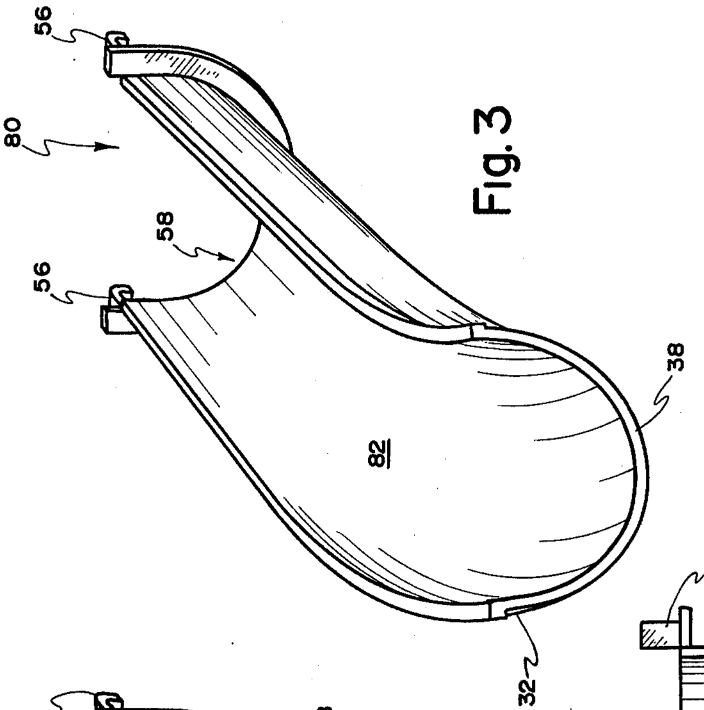
FIG. 3 is an enlarged perspective representation of an elbow concrete discharge chute section, representing a second embodiment of the present invention.
Figure 6:
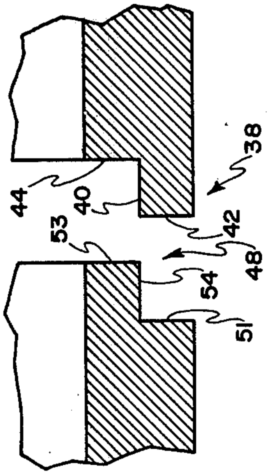
FIG. 6 is a fragmentary enlarged exploded cross section illustrating the lower abutment relationship between two contiguous chute sections.
Figure 4:
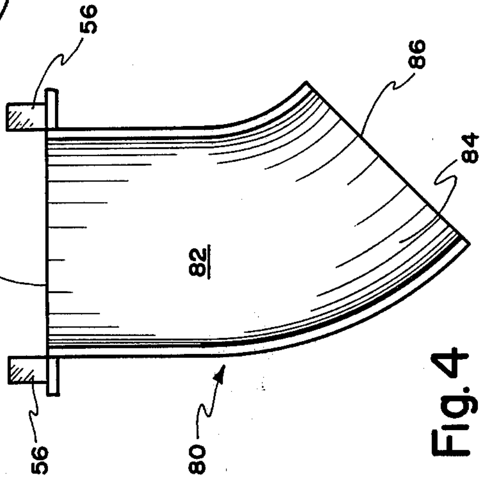
FIG. 4 is a plan view of the concrete discharge chute section shown in FIG. 3.

Reference is now made to FIGS. 3 and 4 which illustrate a second presently preferred concrete discharge section, generally designated 80, according to the present invention. Section 80 may be of steel or other suitable material. The proximal end of the concrete discharge section 80 is substantially identical to the proximal end of section 50 and has been so designated. Accordingly, no further description of the proximal end of section 80 is believed to be necessary.

The section 80 also comprises an interiorly smooth trough 82 the configuration and centerline of which is curvilinear (preferably arcuate). The curve may be in either direction. The cross section of the trough 82 at any location is, however, U-shaped (in the present illustration as is conventional). The distal end 84 of the concrete discharge section 80 comprises a distal edge 86 which is disposed diagonal to the axis of the contiguous chute section.

The distal edge 86 may be exteriorly reinforced as desired and functions in a manner substantially the same as edge 62 of section 50 to cause concrete leaving the chute section 80 to be poured as a stream in substantial alignment with the concrete form, independent of the orientation of the ready mix truck in respect to the concrete form. Thus, as illustrated, the concrete discharge section 80 comprises a 45 degree elbow. Of course, curved discharge chute sections having an included angle other than 45 degrees may be used without departing from the present invention.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A concrete discharge chute section comprising:
   - a substantially rigid trough having an open top defined by spaced top edges;
   - connector means at the proximal end of the chute section sized, shaped and located to match and releasably connect to chute means of a concrete ready mix truck;
   - generally U-shaped substantially rigid discharge means at the distal end of the chute section comprising distal trough means to accommodate, during use, displacement of concrete along a path having a substantial horizontal component and a substantial vertical component and a discharge edge at the end of the distal trough means causing concrete leaving the chute section to fall generally vertically as a stream over said discharge edge in substantial alignment with a concrete form independent of the orientation of the truck in relation to the concrete form, the longitudinal axis of the chute section being at an angle other then 90 degrees to the form when viewed in plan from above the truck.

2. A concrete discharge chute section according to claim 1 wherein the connector means comprise two opposed hooks at one end of the trough, one at each elevated side of the trough, and a stepped proximal edge.

3. A concrete discharge chute section according to claim 1 wherein the centerline of the trough per se is rectilinear and the distal trough means comprise a curvilinear configuration.

4. A concrete discharge chute section according to claim 3 wherein the discharge edge is perpendicular to the immediately adjacent centerline portion of said distal trough means.

5. A concrete discharge chute section according to claim 1 wherein the discharge edge is disposed diagonally in respect to the immediately adjacent centerline portion of the distal trough means.

6. A concrete ready mix truck comprising:
   - a concrete mixer;
   - means selectively dispensing concrete as a stream from the mixer, said dispensing means comprising concrete chute means juxtaposed and receiving concrete from the mixer;
   - a concrete discharge chute section comprising:
     - a substantially rigid trough having an open top defined by spaced top edges;
     - connector means at the proximal end of the concrete discharge chute section sized, shaped and located to match and releasably connect to the concrete chute means;

generally U-shaped substantially rigid discharge means at the distal end of the discharge chute section comprising distal trough means to accommodate, during use, displacement of concrete along a path having a substantial horizontal component and a substantial vertical component and a discharge edge at the end of the distal trough means causing concrete leaving the concrete discharge chute section to fall generally vertically as a stream over said discharge edge in substantial alignment with a concrete form even though there is not alignment of the truck in regard to the concrete form.

7. A method of placing concrete efficiently and without waste comprising the steps of:

placing the conveyor chute of a concrete ready mix truck at an acute angle in respect to a concrete form when viewed in plan from above the truck;

dispensing concrete as a stream into the conveyor chute from a mixer carried by the truck, the direction of said concrete steam in the truck chute having a horizontal and a vertical component of flow and being disposed at an acute angle to the concrete form when viewed in plan;

causing the concrete stream to move from the conveyor chute into a concrete discharge chute section, releasably attached to the distal end of the conveyor chute;

displacing concrete along the concrete discharge chute section so as to cause the stream of concrete to continue to have a horizontal and a vertical component of flow along the entire length of the discharge chute section but causing the stream of concrete leaving the concrete discharge chute section to abruptly change direction and fall vertically in substantial alignment with the concrete form.

8. A method according to claim 7 further comprising the step of adjusting the stream acute angle from time to time to cause the distal edge of the concrete discharge chute section to be substantially parallel to the concrete form.

* * * * *